United States Patent [19]  
Ogata

[11] Patent Number: 5,062,497  
[45] Date of Patent: Nov. 5, 1991

[54] SYSTEM FOR CONTROLLING SPRING COEFFICIENT OF ENGINE MOUNT

[75] Inventor: Hisashi Ogata, Kanagawa, Japan

[73] Assignee: Nissan Motor Company, Limited, Kanagawa, Japan

[21] Appl. No.: 374,668

[22] Filed: Jul. 3, 1989

[30] Foreign Application Priority Data

Jul. 1, 1988 [JP] Japan .............................. 63-87748[U]

[51] Int. Cl.$^5$ ........................................... F16M 13/00
[52] U.S. Cl. .................... 180/300; 248/550; 248/638; 267/140.1; 280/707
[58] Field of Search .............. 267/140.1 AE, 140.1 E; 188/318; 180/300; 248/550, 636, 638; 280/702, 707; 364/424.01

[56] References Cited

U.S. PATENT DOCUMENTS

| | | | |
|---|---|---|---|
| 4,648,576 | 3/1987 | Matsui | 180/300 X |
| 4,689,849 | 9/1987 | Eger et al. | 188/318 X |
| 4,700,933 | 10/1987 | Chikamori et al. | 180/300 X |
| 4,796,874 | 1/1989 | Hoying et al. | 267/140.1 AE |
| 4,802,648 | 2/1989 | Decker et al. | 267/140.1 EX |
| 4,834,349 | 5/1989 | Arai et al. | 267/140.1 AE |

FOREIGN PATENT DOCUMENTS 172742 9/1985 Japan .................. 267/140.1 AE

OTHER PUBLICATIONS

"Chassis Electronic Control Systems" SAE Technical Paper Series Feb. 27, 1984.

Primary Examiner—Andres Kashnikow  
Assistant Examiner—Michael Mar  
Attorney, Agent, or Firm—Lowe, Price, Leblanc & Becker

[57] ABSTRACT

A control system performs control for adjusting spring coefficient of an engine mount in order to set a resonance frequency out of a frequency band of vibration generated on a vehicular body due to roughness or undulation on a road surface. In order to enable this, vehicle driving parameters associated with the vehicle body vibration are monitored so as to perform control of the spring coefficient based thereupon.

3 Claims, 3 Drawing Sheets

FIG.3
FIG.4
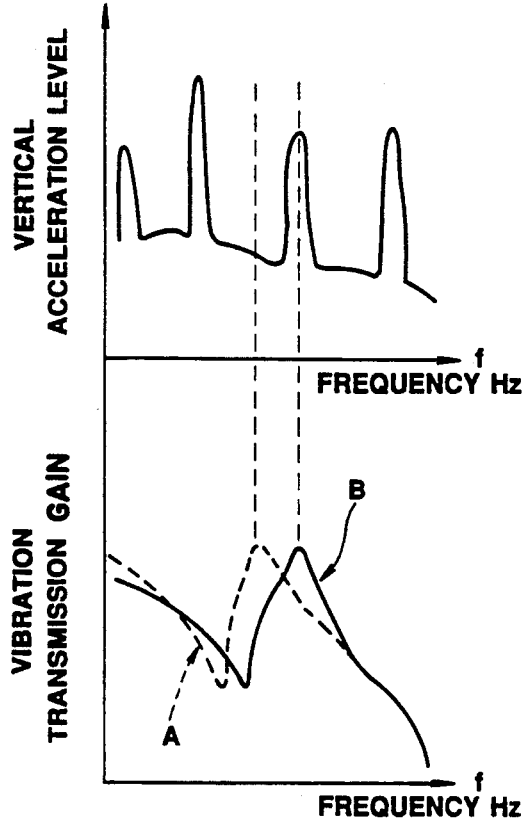
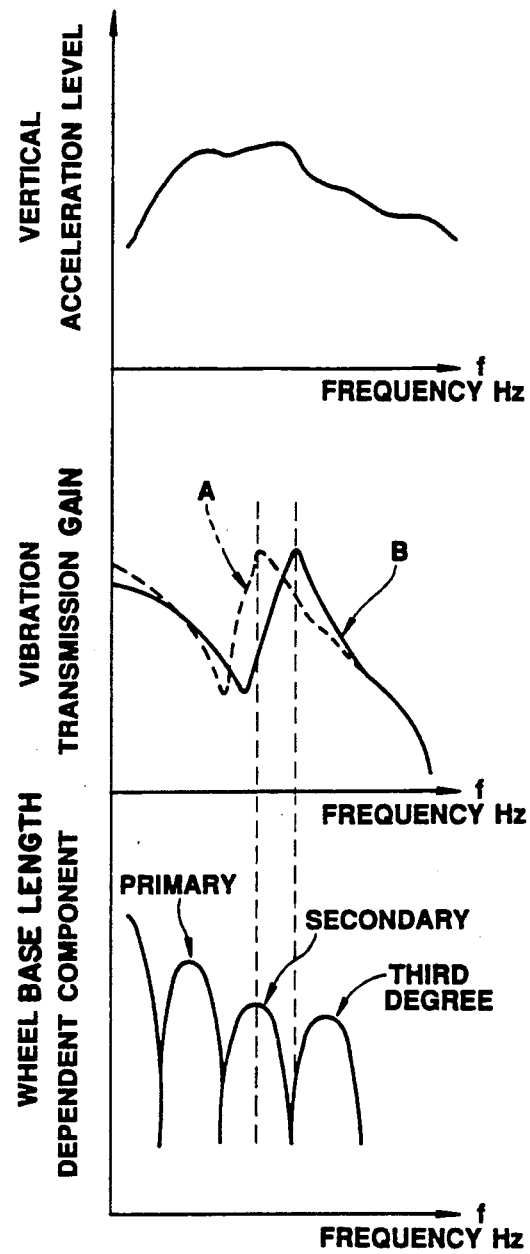

SYSTEM FOR CONTROLLING SPRING COEFFICIENT OF ENGINE MOUNT

BACKGROUND OF THE INVENTION

1. Field of the Invention

The present invention relates generally to a vibration insulative engine mounting structure for an automotive vehicle. More specifically, the invention relates to a control system for controlling spring coefficient of an engine mount insulator for insulating vibration induced in an automotive internal combustion engine from a vehicular body so as to minimize magnitude of engine vibration to be transmitted to the vehicular body.

2. Description of the Background Art

The prior proposed control system for an engine mounting insulator for adjusting spring coefficient depending upon the vehicle driving condition has been illustrated in Japanese Utility Model First (unexamined) Publication (Jikkai) Showa 59-160416. The disclosed control system employs an engine mount insulator which defines an internal space filled with a working fluid. The fluid filled internal space is separated into two chambers. These chambers are connected with each other via a working fluid passage. A valve means is disposed within the working fluid passage in order to switch the valve position between an open position to establish fluid communication between the chambers and a closed position to block fluid communication therethrough. Therefore, according to the position of the valve means, volume of the internal space becomes different to generate different level of vibration damping force in response to the engine vibration.

In the practical control, the valve means is placed at the closed position during an engine accelerating or decelerating state to provide a higher spring coefficient and thus for a greater damping force to be generated in response to the engine vibration. On the other hand, during steady cruising or idling, the valve means is placed at the open position for increasing the volume of the chamber to provide a lower spring coefficient in order to absorb smaller magnitude and high frequency engine induced vibration.

Such prior proposed control system is successful in absorption of the engine induced vibration during engine idling state and the engine accelerating and decelerating state by absorbing smaller magnitude and high frequency vibrations and by damping greater magnitude and low frequency vibrations. However, on the other hand, in case of the vehicle cruising state, there is a possibility of causing resonation in engine due to vibration input from the vehicular body due to road shock and so forth. Particularly, in case the vibration frequency input from the vehicular body to the engine is in the vicinity of the resonance frequency of the vehicular body, resonation of the engine may cause substantial increase of magnitude of vibration to significantly degrade riding comfort of the vehicle.

For example, in case of a road having a specific road profile, the vibration magnitude becomes substantial when the undulation frequency resides close to the resonance frequency of the vehicular body at the vehicular body peak frequency while the engine resonant. On the other hand, in case of an irregularly undulated road, magnitude of vibration generated on the vehicular body becomes substantial when the undulation interval is several integral times of a wheel base dependent frequency component which is determined by a vehicular speed and wheel base length of the vehicular body.

As will be appreciated from the discussion given hereabove, the prior proposed spring coefficient control for the engine mount has not been complete in terms of cruising.

SUMMARY OF THE INVENTION

Therefore, it is an object of the present invention to provide a control system for controlling spring coefficient in an engine mount for solving the drawback encountered in the prior proposed systems.

Another object of the invention is to provide a control system which can reduce magnitude of vehicular body vibration which is otherwise caused by resonation of engine at a specific frequency range of vehicular body vibration.

In order to accomplish aforementioned and other objects, a control system, according to the present invention, performs control for adjusting spring coefficient of an engine mount in order to set a resonance frequency out of a frequency band of vibration generated on a vehicular body due to roughness or undulation on a road surface. In order to enable this, vehicle driving parameters associated with the vehicle body vibration are monitored so as to perform control of the spring coefficient based thereupon.

According to one aspect of the invention, an engine mount system for an automotive power plant for mounting a vehicle body, comprises:

a fluid filled insulator variable of resonating frequency and operable at least between a first low frequency level mode for setting the resonating frequency in supporting the power plant at a first lower frequency level and a second frequency level mode for setting the resonating frequency at a second higher frequency level;

first means associated with the insulator, for controlling operational mode of the insulator between the first frequency level mode and the second frequency level mode;

second means for monitoring a vehicle driving condition affecting a vibration mode of the vehicle body and for producing a vehicular driving condition indicative signal; and third means for receiving the vehicular driving condition indicative signal and detecting a first vehicular body vibration mode with respect to the first frequency level mode and a second vehicular body vibration mode with respect to the second frequency level mode, and selecting one of the first and second frequency modes for commanding to the first means to select one of the first and second level mode so that the vibration mode of the power plant is made to differ from the vibration mode of the vehicle body in order to avoid resonation in vibration between the power plant and the vehicular body.

According to another aspect of the invention, an engine mount system for an automotive power plant for mounting a vehicle body, comprises:

a fluid filled insulator variable of resonating frequency and operable at least between a first low frequency level mode for setting the resonating frequency in supporting the power plant at a first lower frequency level and a second frequency level mode for setting the resonating frequency at a second higher frequency level;

first means associated with the insulator, for controlling operational mode of the insulator between the first frequency level mode and the second frequency level mode;

second means for monitoring a vehicle driving condition affecting for vibration mode of the vehicle body and for producing a vehicular driving condition indicative signal; and third means for receiving the vehicular driving condition indicative signal, detecting a stopping operation the vehicle to select the first frequency level mode, detecting transition state of the vehicle for acceleration and deceleration to select the second frequency level, and detecting operation of the vehicle at constant speed to derive first vehicular body vibration mode with respect to the first frequency level mode and the second vehicular body vibration mode with respect to the second frequency level mode, and to select one of the first and second frequency modes for commanding the first means to select one of the first and second level modes so that the vibration mode of the power plant is caused to differ from the vibration mode of the vehicle body in order to avoid resonation in vibration between the power plant and the vehicular body.

The fluid filled insulator may comprise an insulator body defining a pair of working chambers filled with working fluid, and fluid passage means connecting working chambers for fluid communication between the working chambers, and the first means comprising a valve unit disposed within the fluid passage means for establishing and blocking fluid communication between the working chambers as commanded by the third means. The second means may comprise a vehicle speed sensor for monitoring a vehicle speed to produce a vehicle speed indicative signal and a vertical acceleration sensor for monitoring a vertical acceleration indicative signal.

According to a further aspect of the invention, an engine mount system for an automotive power plant for mounting a vehicle body, comprises:

a fluid filled insulator defining therein at least two fluid chambers mutually separated from each other, and a fluid passage connected to the fluid chambers for fluid communication therebetween;

a valve means disposed within the fluid passage for selectively establishing and blocking fluid communication therethrough, the valve means including an electrically operable means for operating the valve means between open and closed positions;

first sensor means for monitoring vehicle speed for producing a vehicle speed indicative signal;

second sensor means for monitoring a vertical acceleration exerted on the vehicle body to produce a vertical acceleration indicative signal; and control unit receiving the vehicle speed indicative signal and the vertical acceleration indicative signal, the control unit discriminating vehicle driving condition between a first state in which vehicle travels at a constant speed, a second state in which vehicle is accelerating or decelerating and a third state in which the vehicle is stopping or substantially stopping, the control unit operating the valve means at the open position during the first state, at the closed position during the second state, and detects a road surface condition for selectively operating the valve means to the open and closed positions depending upon the vehicle driving condition.

The control unit may determine a road surface dependent first vibration mode having a resonating point at a first specific frequency with respect to operational mode of the insulator in a state that the valve means is in the open position, on the basis of road surface condition and a road surface dependent second vibration mode having a resonating point at a second frequency with respect to operational mode of the insulator in a state that the valve means is in the closed position, on the basis of road surface condition, and the control unit selecting one of first and second vibration mode having resonating point far from the resonating point of the vehicle body.

The control unit may discriminate between irregular undulation of the road surface and regular undulation of the road surface, determine the first and second vibration modes depending upon the vehicle speed indicative signal value and a known wheel base of the vehicle when the road surface condition is an irregular undulation road surface, and determine the first and second vibration mode depending upon an interval of undulation when the road surface condition is a regular undulation road surface. The control unit may check the vertical acceleration indicative signal level for detecting a specific natural frequency at which a vertical acceleration indicative signal level becomes high to detect the regular undulation road surface.

BRIEF DESCRIPTION OF THE DRAWINGS

The present invention will become fully understood from the detailed invention given herebelow and from the accompanying drawings of the preferred embodiment of the invention, which, however, should not be taken to limit the invention to the specific embodiment, but are for explanation and understanding only.

In the drawings:

FIGS. 3 and 4 are graphs showing vibration characteristics on a regularly undulated road and irregularly undulated road in relation to operational mode of an engine mount insulator.

DESCRIPTION OF THE PREFERRED EMBODIMENT

Figure 1:
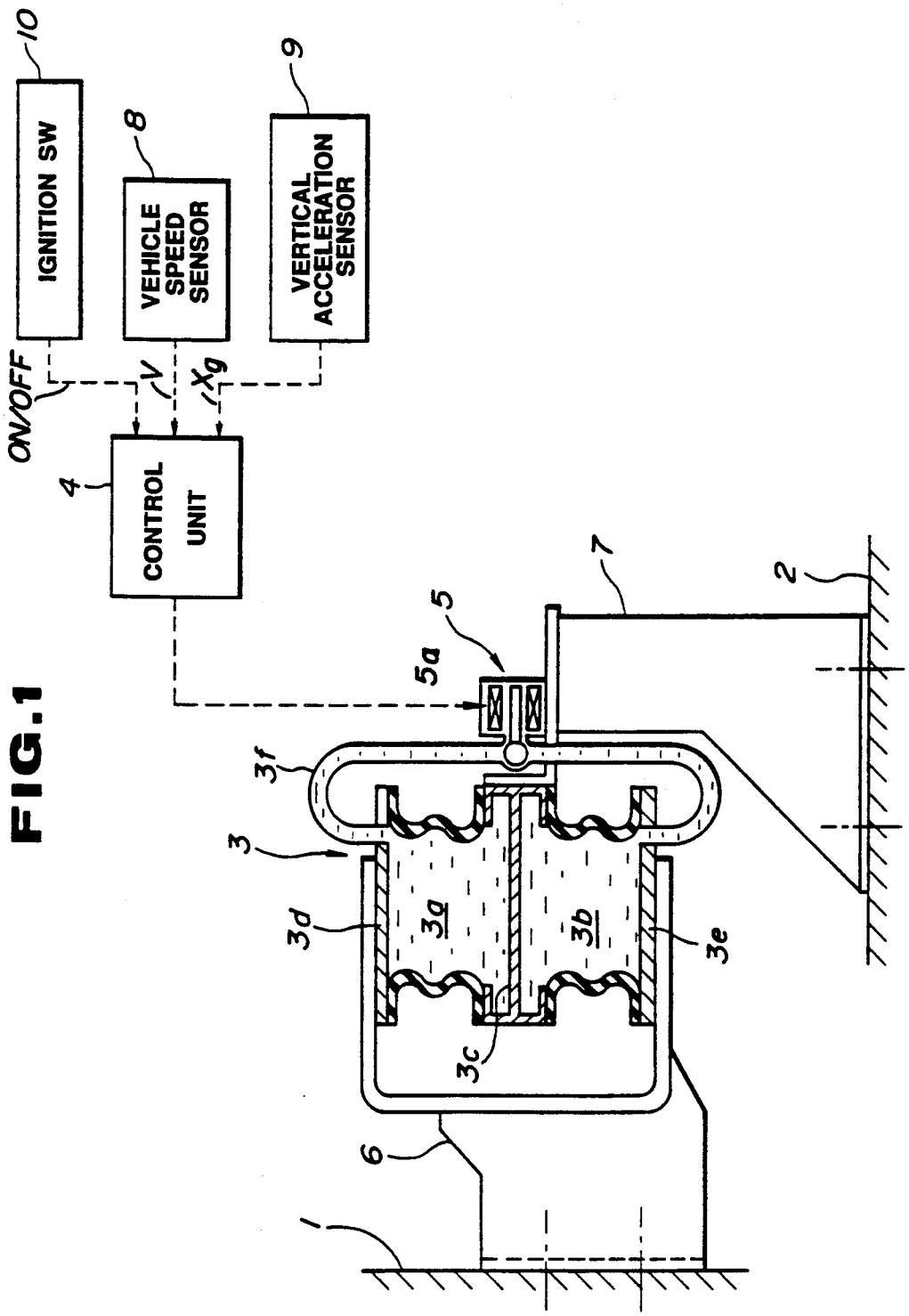
FIG. 1 is a diagrammatical illustration of the preferred embodiment of a control system for an engine mount, according to the present invention.

Referring now to the drawings, particularly to FIG. 1, the preferred embodiment of an engine mount unit is disposed between a power plant 1 which includes an automotive internal combustion engine and a power transmission and so forth, and a vehicular body 2. The engine mount unit includes an insulator assembly 3 which defines a pair of hollow working chambers 3a and 3b separated by means of a partition 3c. Working fluid is filled in the working chambers 3a and 3b. The working chambers 3a and 3b are connected to each other by means of a fluid path tube 3f.

The insulator assembly 3 has end plates 3d and 3e rigidly connected to the power plant 1 via a mounting bracket 6. On the other hand, the partition 3c is rigidly connected to the vehicular body 2 via a mounting bracket 7. Therefore, the partition 3c and the end plates 3d and 3e move relative to each other according to relative displacement between the power plant 1 and the vehicular body 2.

A valve unit 5 is associated with the fluid path tube 3f for establishing and blocking fluid communication therethrough depending upon its valve position. In the shown embodiment, the valve position is switched between open position and closed position to establish and block fluid communication through the fluid path tube 3f in order to adjust vibration absorption and damping characteristics of the insulator. The valve unit 5 includes an electrically operable actuator 5a for switching the valve position between the open position and closed position. The actuator 5a of the valve unit 5 is connected to an electronic control unit 4. The electronic control unit 4 may comprise a microprocessor and is connected to a vehicle speed sensor 8 and vertical acceleration sensor 9. The vehicle speed sensor 8 may have conventionally well known construction and operation for monitoring the vehicle traveling speed to produce a vehicle speed indicative signal V. On the other hand, the vertical acceleration sensor 9 may be associated with a vehicular suspension system and designed for monitoring a vertical displacement between the vehicular body 2 and a suspension member which rotatably supports a road wheel. The vertical acceleration sensor 9 produces a vertical acceleration indicative signal Xg representative of the monitored vertical acceleration of the vehicle. The control unit 4 is also connected to an ignition switch 10 which serves as a main power switch.

The control unit 4 receives the vehicle speed indicative signal V of the vehicle speed sensor 8, the vertical acceleration indicative signal Xg of the vertical acceleration sensor 9 and the ON/OFF state indicative signal of the ignition switch 10. The control unit 4 of the spring coefficient control system for the engine mount is triggered in response to turning ON of the ignition switch and terminated in response to turning OFF of the ignition switch 10 in order to perform control of the valve position and thereby of the spring coefficient of the insulator 3. The control unit 4 detects the vehicle driving condition on he basis of the vehicle speed indicative signal V and the vertical acceleration indicative signal Xg and derives a control signal for controlling the valve position of the valve unit 5. In the shown embodiment, the valve unit 5 is operated between open and closed position for establishing and blocking fluid communication between the chambers 3a and 3b. When the fluid communication via the valve unit 5 is established, the volume of the fluid chamber is increased for providing greater vibration absorption and smaller vibration damping. On the other hand, when the fluid communcation is blocked, the volume of the fluid chambers 3a and 3b becomes smaller for independency of the chambers. As a result, smaller vibration absorbing ability and greater vibration damping ability can be obtained.

Figure 2:
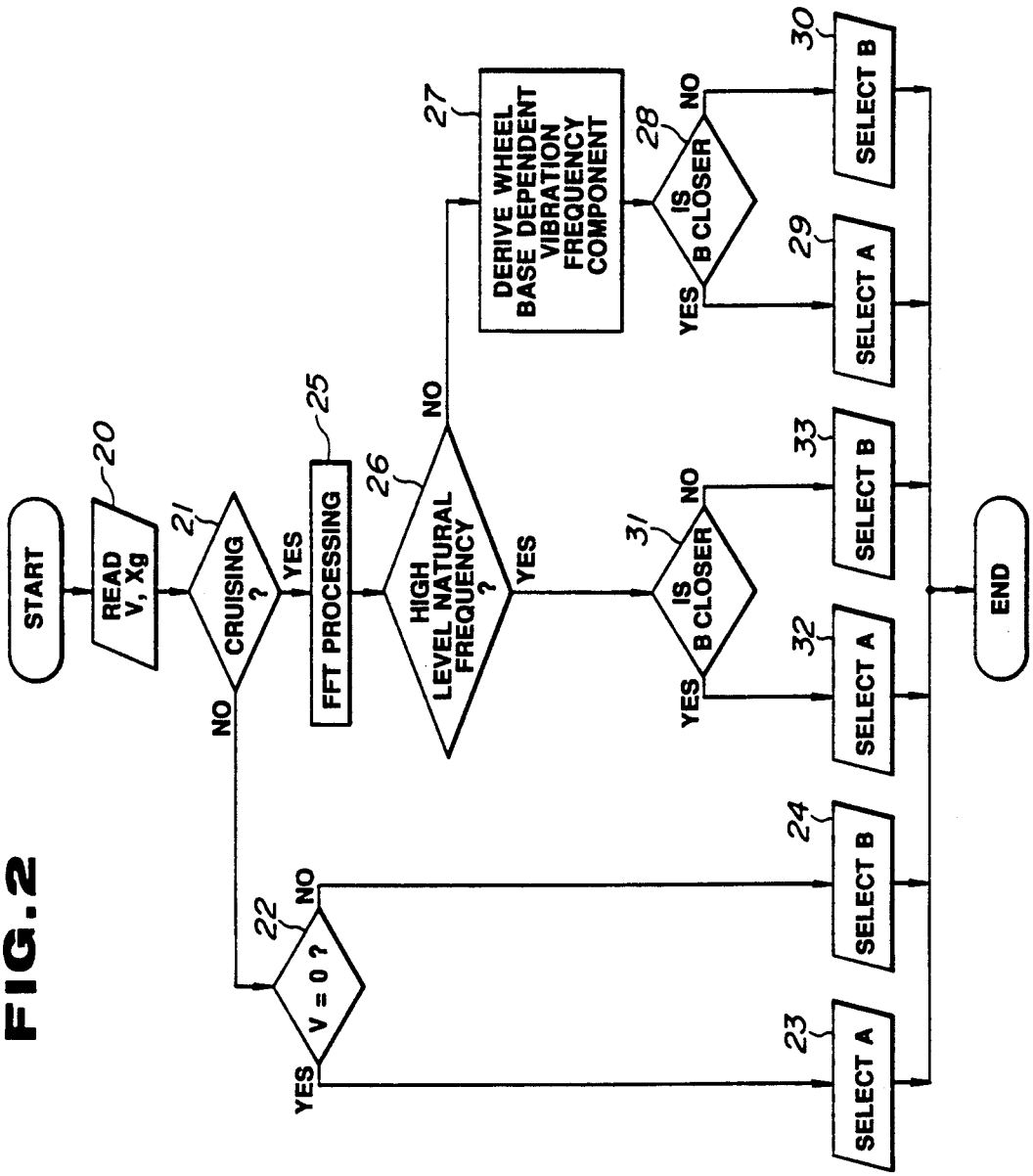
FIG. 2 is a flowchart of a program for implementing the preferred process of spring coefficient control according to the invention.

Practical implementation of spring coefficient control to be performed in the preferred embodiment of the engine mount control system will be discussed herebelow with reference to a flowchart of FIG. 2.

Immediately after starting execution, the vehicle speed indicative signal V and the vertical acceleration indicative signal Xg are read out at a step 20. Then, on the basis of the vehicle speed indicative signal V, vehicle driving condition is discriminated to determine whether the vehicle is cruising at a substantially constant speed, at a step 21. Practically, discrimination is performed by comparing the vehicle speed indicative signal V read at the step of the current execution cycle with vehicle speed indicative signals V or a running average over a predetermined number of precedingly read vehicle speed indicative signals. In the alternative, it is also possible to discriminate whether the vehicle is in cruising state or not by deriving a differentiated value of the vehicle speed indicative signal V. In the former case, judgement that the vehicle is in the crusing state will be made when a difference or differences as resultants of the comparison, is within a predetermined range of values and when the vehicle speed is not zero. On the other hand, in the later case, judgement that the vehicle is in cruising state will be made when the differentiated value is smaller than a predetermined value and when the vehicle speed is not zero.

At the step 21, a check is performed whether the vehicle speed is maintained substantially at constant speed or not and whether the vehicle speed is not zero. If the answer at the step 21 is negative, then a check is performed whether the vehicle speed is zero or not, at a step 22. If the answer is positive, judgement can be made that the vehicle is not running. Therefore, judgement can be made that the engine is in an idling condition or substantially low load condition. Then, process goes to a step 23 for outputting the control signal to operate the valve unit 5 to the open position. Therefore, the insulator 3 becomes softer for greater vibration absorbing ability. At this valve position, the resonating frequency of the insulator becomes low. This mode of operation of the engine mount control system will be hereafter referred to as "LOW resonating frequency mode A".

On the other hand, when the answer at the step 22 is negative and thus judgement is made that the vehicle is in a travelling state, then process goes to a step 24, in which the control signal for operating the valve unit 5 to the closed position is output. By operating the valve unit 5 at the closed position, the insulator 3 becomes harder for generating greater damping force against vibration. At this valve position, the resonating frequency of the insulator 3 becomes higher. This mode of operation of the engine mount control system will be hereafter referred to as "HIGH resonating frequency mode B".

When the vehicle speed as checked at the step 21 is substantially constant and is not zero, and thus judgement can be made that the vehicle is in a cruising state at substantially constant speed, then process goes to a step 25. At the step 25, the vertical acceleration indicative signal Xg is filtered to remove noise. Then, the filtered vertical acceleration indicative signal Xg is checked at a step 26 to determine whether a natural frequency range is or is not present at which the level of vertical acceleration indicative signal is higher than a predetermined level, is present or not. When no natural frequency range where the level of vertical acceleration indicative signal is detected as checked at the step 26, judgement is made that the vehicle is traveling on irregularly undulated road. In such case, at a step 27, a wheel base length dependent vibration frequency component is determined on the basis of the wheel base length and the vehicle speed V. Namely, the wheel base length dependent frequency component represents a frequency range at which resonating vibration is generated for a greater magnitude than that in other frequency range. The wheel base length dependent frequency components in the low resonating frequency mode A and that in the high resonating frequency mode B are derived at the step 27. Thereafter a check is performed by comparing both of the wheel base length speed dependent frequency components with a vehicle body peak frequency at which the vehicular body vibration becomes higher magnitude than that of the remainders, at a step 28. Through this process, judgement is made that the wheel base length dependent frequency component at the high resonating frequency mode is closer to the vehicle body peak frequency than the wheel base length dependent frequency component at the low resonating frequency mode A. If the answer at the step 28 is positive, then the low resonating frequency mode A is selected at a step 29 for operating the valve unit 5 at the open position. On the other hand, when the answer at the step 28 is negative, which means that the wheel base length dependent frequency component at the high resonating mode B is closer or when the wheel base length dependent frequency component at the high resonating frequency has an equal difference in frequency to the vehicle body peak frequency as to that of the wheel base length dependent frequency component at the low resonating frequency mode A, then the high resonating frequency mode operation is selected at a step 30.

By the operational mode of the engine mount control system for the wheel base length dependent frequency component having greater difference to the vehicle body peak resonating frequency, the engine and vehicle body may vibrate at mutually different vibration modes. As a result, resonation of vibration in the engine and the vehicle body is hardly caused. Therefore, magnitude of vibration of the engine and the vehicular body can be maintained at the satisfactorily low level because of prevention of resonation.

On the other hand, when the vehicle travels on a regular undulation road, the vertical acceleration indicative signal level becomes higher at a certain natural frequency range. Therefore, the answer at the step 26 becomes positive. In such case, the vibration component at the frequency range at which higher level vertical acceleration indicative signal level is detected with respect to the low resonating frequency mode A and high resonating frequency mode B. This frequency range of high or greater level vertical acceleration indicative signal than that in other frequency range will be hereafter referred to as "road undulation dependent frequency component". At a step 31, the road undulation dependent frequency components derived at the low resonating frequency mode A and the high resonating frequency mode B is compared with the vehicle body peak frequency. When the road undulation dependent frequency component at the high resonating frequency mode is closer to the vehicle body peak frequency as checked at the step 31, then the low resonating frequency mode is selected at a step 32. On the other hand, if the road undulation dependent frequency component at the low resonating frequency mode is closer to the vehicle body peak frequency or the differences of the road undulation dependent frequency component in either mode to the vehicle body peak frequency are even, then the high resonating frequency mode is selected at a step 33. By the operational mode of the engine mount control system for the wheel base length dependent frequency component having greater difference to the vehicle body peak resonating frequency, the engine and vehicle body may vibrate at mutually different vibration modes. As a result, resonation of vibration in the engine and the vehicle body is hardly caused. Therefore, magnitude of vibration of the engine and the vehicular body can be maintained at the satisfactorily low level because of prevention of resonation.

What is claimed is:

1. An engine mount system for an automotive power plant for mounting a vehicle body, comprising:

a fluid filled insulator defining therein at least two fluid chambers mutually separated from each other, and a fluid passage connected to said fluid chambers for fluid communication therebetween;

valve means disposed within said fluid passage for selectively establishing and blocking fluid communication therethrough, said valve means including electrically operable means for operating said valve means between open and closed positions;

first sensor means for monitoring a vehicle speed for producing a vehicle speed indicative signal;

second sensor means, associated with a vehicular suspension member rotatably supporting a road wheel, for monitoring a vertical displacement between the vehicle body and the suspension member to produce a vertical acceleration indicative signal of said suspension member, in such a manner as to detect a road surface condition;

a control unit for receiving said vehicle speed indicative signal and said vertical acceleration indicative signal and discriminating between a first state of a vehicle driving condition, wherein a vehicle travels at a constant speed, a second state of the vehicle driving condition, wherein the vehicle is accelerating or decelerating, and a third state of the vehicle driving condition, wherein the vehicle is stopping or substantially stopping, said control unit operating said valve means at said open position during said third state, and at said closed position during said second state, said control unit further discriminating said road surface condition on the basis of said vertical acceleration indicative signal from said second sensor means;

wherein said control unit selects one of two road surface dependent vibration modes of said insulator, one being a road surface dependent first vibration mode having a resonating point at a first specific resonant frequency with respect to an operational mode of said insulator in a state wherein said valve means is in said open position, the other being a road surface dependent second vibration mode having a resonating point at a second specific resonant frequency with respect to the operational mode of said insulator in a state wherein said valve means is in said closed position, on the basis of said road surface condition; and wherein said control unit selects one of said first and second vibration modes having a resonating point far from the resonating points of the vehicle body derived on the basis of a value of said vehicle speed indicative signal and a known wheel base of the vehicle when said control unit determines that said driving condition is in said first state and said road surface condition is an irregular undulation road surface, and selects one of said first and second vibration modes having a resonating point far from the resonating points of the vehicle body derived on the basis of an interval of undulation when said control unit determines that said driving condition is in said first state and said road surface condition is a regular undulation road surface.

2. An engine mount system for an automotive power plant for mounting a vehicle body, comprising:

a fluid filled insulator defining therein at least two fluid chambers mutually separated from each other, and a fluid passage connected to said fluid chambers for fluid communication therebetween;

valve means disposed within said fluid passage for selectively establishing and blocking fluid communication therethrough, said valve means including electrically operable means for operating said valve means between open and closed positions;

first sensor means for monitoring a vehicle speed for producing a vehicle speed indicative signal;

second sensor means, associated with a vehicular suspension member rotatably supporting a road wheel, for monitoring a vertical displacement between the vehicle body and the suspension member to produce a vertical acceleration indicative signal of said suspension member, in such a manner as to detect a road surface condition;

a control unit for receiving said vehicle speed indicative signal and said vertical acceleration indicative signal and discriminating between a first state of a vehicle driving condition, wherein a vehicle travels at a constant speed, a second state of the vehicle driving condition, wherein the vehicle is accelerating or decelerating, and a third state of the vehicle driving condition, wherein the vehicle is stopping or substantially stopping, said control unit operating said valve means at said open position during said third state, and at said closed position during said second state, said control unit further discriminating said road surface condition on the basis of said vertical acceleration indicative signal from said second sensor means;

wherein said control unit selects one of two road surface dependent vibration modes of said insulator, one being a road surface dependent first vibration mode having a resonating point at a first specific resonant frequency with respect to an operational mode of said insulator in a state wherein said valve means is in said open position, the other being a road surface dependent second vibration mode having a resonating point at a second specific resonant frequency with respect to the operational mode of said insulator in a state wherein said valve means is in said closed position, on the basis of said road surface condition;

wherein said control unit selects one of said first and second vibration modes having a resonating point far from the resonating points of the vehicle body derived on the basis of a value of said vehicle speed indicative signal and a known wheel base of the vehicle when said control unit determines that said driving condition is in said first state and said road surface condition is an irregular undulation road surface, and selects one of said first and second vibration modes having a resonating point far from the resonating points of the vehicle body derived on the basis of an interval of undulation when said control unit determines that said driving condition is in said first state and said road surface condition is a regular undulation road surface; and wherein said control unit checks said vertical acceleration indicative signal for detecting a specific natural frequency at which said vertical acceleration indicative signal becomes high to detect said regular undulation road surface.

3. An engine mount system for an automotive power plant for mounting a vehicle body, comprising:

a fluid filled insulator defining therein at least two fluid chambers mutually separated from each other, and a fluid passage connected to said fluid chambers for fluid communication therebetween;

valve means disposed within said fluid passage for selectively establishing and blocking fluid communication therethrough, said valve means including electrically operable means for operating said valve means between open and closed positions;

first sensor means for monitoring a vehicle speed for producing a vehicle speed indicative signal;

second sensor means for monitoring a road surface condition to produce a road surface condition indictive signal;

a control unit for receiving said vehicle speed indicative signal and said road surface condition indicative signal and discriminating a vehicle driving condition between a first state wherein a vehicle travels at a constant speed, a second state wherein the vehicle is accelerating or decelerating and a third state wherein the vehicle is stopping or substantially stopping;

said control unit discriminating said road surface condition between an irregular undulation road surface and a regular undulation road surface on the basis of said road surface condition;

wherein said control unit selects one of two road surface dependent vibration modes of said insulator, one being a road surface dependent first vibration mode having a resonating point at a first specific resonant frequency with respect to an operational mode of said insulator in a state wherein said valve means is in said open position, the other being a road surface dependent second vibration mode having a resonating point at a second specific resonant frequency with respect to the operational mode of said insulator in a state wherein said valve means is in said closed position, on the basis of said road surface conditions; and wherein said control unit selects one of said first and second vibration modes having a resonating point far from the resonating points of the vehicle body derived on the basis of a value of said vehicle speed indicative signal and a known wheel base of the vehicle when said control unit determines that said driving condition is in said first state and said road surface condition is an irregular undulation road surface, and selects one of said first and second vibration modes having a resonating point far from the resonating points of the vehicle body derived on the basis of an interval of undulations when said control unit determines that said driving condition is in said first state and said road surface condition is a regular undulation road surface.

* * * * *